Jan. 11, 1955

A. E. SCHMIDLIN 2,699,364

BEARING STRUCTURE

Filed June 30, 1951

INVENTOR.
Albertus E. Schmidlin
BY
J. William Carson
ATTORNEY

United States Patent Office 2,699,364
Patented Jan. 11, 1955

2,699,364

BEARING STRUCTURE

Albertus E. Schmidlin, Caldwell, N. J., assignor to Specialties Development Corporation, Belleville, N. J., a corporation of New Jersey Application June 30, 1951, Serial No. 234,546

10 Claims. (Cl. 308—5)

The present invention relates to thrust-type bearing structure for minimizing sliding friction between moving parts, and, more particularly, relates to bearing structure such as shown in my copending application for United States Letters Patent, Serial No. 730,971, filed February 26, 1947, now Patent No. 2,562,954, of which this application is a continuation-in-part.

In the aforementioned application, a multi-stage air compressor is illustrated which comprises a primary stage cylinder and one or more subsequent stage cylinders. The primary stage cylinder includes a piston or plunger operatively connected with a crankshaft by means of a cam member which serves to operate the piston of the subsequent stage cylinder or cylinders, each piston carrying bearing structure for cooperating with a cam surface of the cam member to minimize sliding friction. The present invention is primarily concerned with such bearing structure, and, for convenience, is described herein in connection with such a cam and plunger arrangement. However, it will be appreciated that bearing structure in accordance with the broad aspects of this invention is applicable for other purposes where thrust is exerted between moving members and it is desirable to minimize sliding friction.

Accordingly, an object of the present invention is to provide bearing structure of the foregoing character which is simple and economical in construction and which overcomes the disadvantages of bearing structure utilized heretofore for similar purposes.

Another object is to provide a self-aligning thrust bearing of the slipper type.

A further object is to provide such bearing structure which is durable in construction and is adapted for high speed operation over long periods.

A still further object is to provide such bearing structure wherein the cooperating friction surfaces maintain a film of oil therebetween.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects are generally accomplished by providing a bearing structure comprising a member having a substantially flat surface, an element having a socket facing the surface and having its longitudinal axis perpendicular to the surface, a bearing having a substantially flat surface engaging the first mentioned surface and an annular arc-shaped surface disposed in the socket, the center of curvature of the last mentioned surface being at a point spaced from the first mentioned surface in the direction in which the socket faces, and means for effecting relative movement between the bearing and the member to cause the flat surfaces to slide with respect to each other.

In the illustrative embodiments of the invention about to be described, the bearing is attached to the element for tilting movement with respect thereto by suitable means such as a ring. Preferably, the element is provided with a head in which the socket is formed and this head has a shoulder surface engaged by the ring. If desired, the bearing structure may include a button disposed in the socket and a cup extending about the button and the head which has the flat bearing surface, and the ring may serve to connect the cup and the head. The head may further be provided with an annular spherical section on its shoulder for cooperating with a similar surface provided on the ring. Suitable pins or the like may be utilized to removably attach the cup to the ring, and a resilient member disposed in a groove encircling the cup may be utilized to maintain the pins in position.

Figure 1:
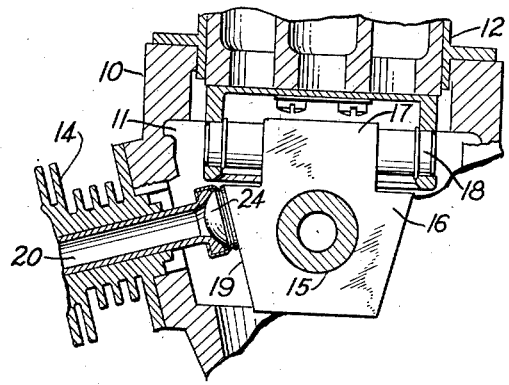
Fig. 1 is a fragmentary sectional view illustrating bearing structure in accordance with the present invention as used in connection with a cam operated plunger.

Referring to the drawing in detail and more particularly to Fig. 1 thereof, there is shown a portion of the air compressor disclosed in the aforementioned patent application. This compressor comprises a housing 10 having a crankcase 11, a primary stage cylinder 12 and one or more subsequent stage cylinders of which only cylinder 14 is shown. A crank extends crosswise within the crankcase, and has an eccentric portion 15 rotatably journalled in a cam member 16 which is of generally keystone shape and is adapted to be moved in a circular or rotary path by the crank. This cam member is connected to the primary stage piston by a sleeve section 17 slidably disposed about a wrist pin 18 carried by the primary stage piston, and has a flat cam surface 19 in sliding engagement with the cooperating surface of bearing structure associated with an element or plunger 20 serving as the piston of the cylinder 14, whereby rotary motion of the cam member imparts reciprocating motion to the plunger. As will be noted, the plunger and cam member are not rigidly or structurally connected but are so arranged that the cam member effects positive movement of the plunger during the compression stroke and pressure in the cylinder urges the plunger towards the cam member during the intake stroke whereby the cam surface and plunger bearing surface are always maintained in sliding engagement.

As previously mentioned, the foregoing arrangement is illustrative only of one manner of utilizing the invention in practice, it being understood that the bearing structure about to be described in detail may be utilized for many other purposes to minimize sliding friction between the cooperating surfaces of relatively moving parts.

Figure 2:
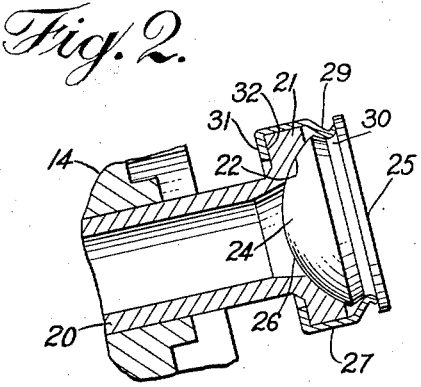
Fig. 2 is an enlarged fragmentary sectional view of the bearing structure apart from the operating cam or other surface on the bearing slides.

As shown in Fig. 2, the plunger is formed with a head 21 having a socket 22 in the face thereof. A button or bearing element 24 has a flat surface 25 for engaging the cam surface 19, and has an annular arc-shaped surface or spherical section 26 disposed in the socket 22 for permitting tilting movement of the button with respect to the head. The arc-shaped surface or spherical section 26 has a center of curvature at a point in the longitudinal axis of the plunger spaced from the cam surface 19 in the direction in which the socket faces. In other words, this center of curvature is within the cam member 16 while the button is in engagement with the cam surface 19. The advantage of this arrangement will be described hereinafter.

The bearing element or button 24 is attached to the plunger by a ring 27 having a portion 29 fitting into a groove 30 in the button and having a flange 31 engaging a shoulder section 32 of the head 21.

Figure 3:
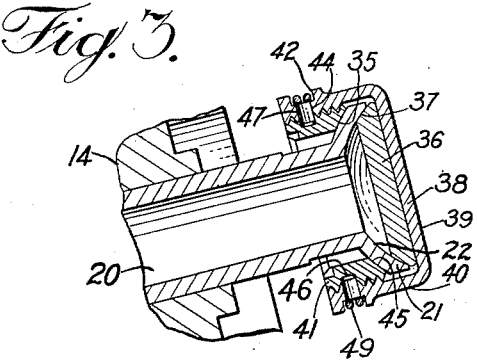
Fig. 3 is a view similar to Fig. 2, illustrating another form of bearing structure embodying the invention.

In Fig. 3, another form of bearing structure is illustrated which operates in the same manner as the bearing structure just described but further includes features of construction which render such bearing structure more serviceable. The head 21 of the plunger 20 in this instance is provided with an annular spherical shoulder section 35, a button 36, having a spherical section 37 is disposed in the socket 22 formed in the head, and a generally cylindrical cup 38 extends about the head and confines the button 36 in its socket.

This cup has a flat surface 39 for slidably engaging a cooperating surface, such as the cam surface for example, and has a skirt 40 extending axially inwardly beyond the head for receiving a ring 41 adapted to attach the cup to the head. The skirt is provided with an annular groove 42 adjacent its free edge and is provided with two or more radial apertures 44 extending from the groove 42 through the wall thereof.

The ring 41 is provided with an annular spherical section 45 engaging and cooperating with the shoulder section 35 of the head to form a joint between the ring and the head. The ring is further provided with radial recesses 46 aligned with the apertures 44 of the cup whereby pins 47 having one end in the apertures 44 and having the other end in the recesses 46 are adapted to connect the cup and ring.

The pins 47 preferably are removably mounted in the apertures and recesses but are retained in assembly by means of an annular member 49 disposed in the groove 42. This annular member preferably is resilient to facilitate assembly and removal, and is constructed and arranged to constrict itself within the groove to effectively retain the pins. The member 49 may be a coiled helical wire spring having at least two convolutions and being formed with a diameter slightly smaller than that of the groove 42.

In the bearing structure just described, the cup is positively retained on the plunger, but free tilting movement of the cup about the head is made possible by means of the cooperating shoulder and ring surfaces 35 and 45 and the socket and button arrangement within the cup.

Figure 4:
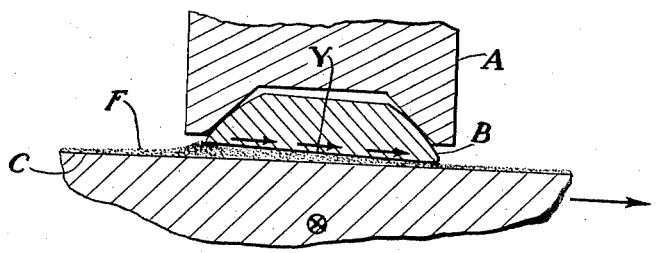
Fig. 4 is a schematic view of bearing structure in accordance with the invention illustrating the operation thereof.

In Fig. 4, a schematic arrangement of the plunger or other element A formed with the socket, the bearing element or slipper B corresponding to the button alone (Fig. 2) or the button and cup assembly (Fig. 3) and the cam member surface or other surface C cooperating with the flat surface of the bearing element are illustrated. As shown herein, the center of curvature of the spherical section of the bearing element is located at X, that is, inside of the moving part which for purposes of illustration may be the cam member. A film of oil F or other lubricant is provided between the cooperating flat surfaces.

Assuming that the cam member is in motion towards the right as viewed, a frictional drag on the bearing element or slipper is applied at Y. This friction force introduces a clockwise movement on the bearing element B to tilt the same in a clockwise direction as shown. This establishes a wedge of oil film on which the element B rides thereby resulting in good lubrication and producing hydrodynamic film lubrication affording a very low coefficient of friction. It will be noted that this is accomplished by having the center of curvature X below the surface C as viewed. If the center of curvature were located above the surface C, the frictional drag would induce counterclockwise movement of the element B causing the same to dig into the surface C and wipe off the oil film to greatly minimize hydrodynamic lubrication and increase frictional resistance.

When the cam member moves towards the left, counterclockwise tilting of the bearing element B is induced and this element again rides on a wedge of oil to assure good hydrodynamic lubrication.

From the foregoing description, it will be seen that the present invention provides an improved bearing structure which is simple, practical and economical in construction; can be put to a great variety of uses as a cam follower or thrust bearing; and can readily withstand such rough usage to which the same may normally be subjected.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. Bearing structure comprising a member having a substantially flat surface, an element having its longitudinal axis perpendicular to said surface and having a head provided with a socket at one side thereof and provided with an annular shoulder surface at the other side thereof, a bearing having a substantially flat surface engaging said surface of said member and having an annular arc-shaped surface disposed in said socket, the center of curvature of said last mentioned surface being at a point spaced from said first flat surface in the direction in which said socket faces, a ring having an annular zone engaging said shoulder surface of said head for movably attaching said bearing to said head, and means for effecting relative movement between said bearing and said member to cause said flat surfaces to slide with respect to each other.

2. Bearing structure comprising a member having a substantially flat surface, an element having an annular external surface and a socket facing said surface and having its longitudinal axis perpendicular to said surface, a second member having a spherical surface disposed in said socket and being movable therein, the center of curvature of said last mentioned surface being at a point spaced from said first flat surface in the direction in which said socket faces, a third member movable with said second member having a substantially flat surface engaging said surface of said first member, said third member having an annular portion in movable engagement with said annular external surface, and means for effecting relative movement between said first and third members to cause said flat surfaces to slide with respect to each other.

3. A bearing structure comprising a movable member provided with a head having a circular socket in the face thereof and having an annular spherical shoulder section, a button having an annular spherical section disposed in said socket, a cup extending about said button and said head having a substantially flat cam engaging surface, and a ring disposed within said cup having an annular spherical section engaging said shoulder section.

4. A bearing structure according to claim 3, wherein a pair of pins connect said cup and ring to assemble said button, cup and ring on said head as a unit.

5. A bearing structure according to claim 4, wherein said cup has a skirt formed with an annular groove at the exterior thereof and a pair of opposed apertures extending inwardly from said groove for receiving one end of said pins, said ring having a pair of recesses aligned with said apertures for receiving the other end of said pins, and an annular member is disposed in said groove for retaining said pins in said apertures.

6. A bearing structure according to claim 5, wherein said annular member is a resilient element constructed and arranged to constrict itself within said groove.

7. A bearing structure according to claim 6, wherein said element is a coiled helical wire spring having at least two convolutions.

8. Bearing structure comprising a member having a substantially flat surface, an element having an annular external surface and a generally spherical socket facing said flat surface and having its longitudinal axis perpendicular to said flat surface, a bearing assembly including follower means and retainer means, said follower means having a flat surface adapted to abut said first flat surface and having a generally spherical surface disposed in said socket, the center of curvature of said last mentioned surface being at a point spaced from said first flat surface in the direction in which said socket faces, said retainer means having an annular portion in engagement with said annular surface and having a portion engaging said follower means to movably retain the same with respect to said socket, and means for effecting relative movement between said follower means and said member to cause said flat surfaces to slide with respect to each other.

9. Bearing structure comprising a cam member having a substantially flat surface, an element having an annular external surface and a generally spherical socket facing said flat surface and having its longitudinal axis perpendicular to said flat surface, a bearing assembly including follower means and retainer means, said follower means having a flat surface and having a spherical surface disposed in said socket, the center of curvature of said last mentioned surface being at a point spaced from said first flat surface in the direction in which said socket faces, said retainer means having an annular portion in engagement with said annular surface and having a portion engaging said follower means to movably retain the same with respect to said socket, said element constituting means for urging said second flat surface towards said cam member in the direction of its longitudinal axis, and crank means for moving said cam member in a circular path, whereby sliding movement between said flat surfaces is effected and said element reciprocates along its longitudinal axis.

10. Bearing structure comprising a member having a substantially flat surface, an element for supporting a bearing having an annular external surface and a generally spherical socket facing said member and having its longitudinal axis perpendicular to said flat surface, a bearing assembly including follower means and retainer means, said follower means having a flat surface and having a spherical surface disposed in said socket for tilting movement therein, the center of curvature of said last mentioned surface being at a point spaced from said first flat surface in the direction in which said socket faces, said retainer means having an annular portion in movable engagement with said annular surface and having a portion engaging said follower means to movably retain the same with respect to said socket, said element constituting means for urging said follower means towards said cam member in the direction of its longitudinal axis, and crank means for effecting relative movement between said bearing and said member to cause said flat surfaces to slide with respect to each other whereby a frictional drag between said bearing and said member will cause said bearing to tilt and enable a wedge of oil film to be established on which the bearing rides to minimize the friction between said flat surfaces.

References Cited in the file of this patent

UNITED STATES PATENTS

| | | |
|---|---|---|
| 2,067,191 | Hudson | Jan. 12, 1937 |
| 2,137,487 | Hall | Nov. 22, 1938 |
| 2,250,607 | Sherman | July 29, 1941 |
| 2,345,125 | Huber | Mar. 28, 1944 |

FOREIGN PATENTS

| | | |
|---|---|---|
| 384,386 | Great Britain | Dec. 8, 1932 |